United States Patent
Fink et al.

(10) Patent No.: US 9,208,055 B2
(45) Date of Patent: *Dec. 8, 2015

(54) IMPORTANCE-BASED CALL GRAPH CONSTRUCTION

(71) Applicant: International Business Machines Corporation, Armonk, NY (US)

(72) Inventors: Stephen Fink, Yorktown Heights, NY (US); Yinnon Avraham Haviv, Beerotaim (IL); Marco Pistoia, Amawalk, NY (US); Omer Tripp, Har-Adar (IL); Omri Weisman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/734,889

(22) Filed: Jan. 4, 2013

(65) Prior Publication Data

US 2013/0191691 A1    Jul. 25, 2013

Related U.S. Application Data

(63) Continuation of application No. 12/437,894, filed on May 8, 2009, now Pat. No. 8,375,371.

(51) Int. Cl.
| | | |
|---|---|---|
| G06F 9/44 | (2006.01) |
| G06F 11/36 | (2006.01) |
| G06T 11/20 | (2006.01) |
| H04M 15/00 | (2006.01) |

(52) U.S. Cl.
CPC .......... *G06F 11/3604* (2013.01); *G06T 11/206* (2013.01); *H04M 15/00* (2013.01); *H04M 15/58* (2013.01); *H04M 15/83* (2013.01); *H04M 15/85* (2013.01); *H04M 15/851* (2013.01); *H04M 2215/0188* (2013.01); *H04M 2215/815* (2013.01); *H04M 2215/82* (2013.01)

(58) Field of Classification Search
None
See application file for complete search history.

(56) References Cited

U.S. PATENT DOCUMENTS

| | | | |
|---|---|---|---|
| 5,790,858 A | | 8/1998 | Vogel |
| 5,828,883 A | | 10/1998 | Hall |
| 6,049,666 A | * | 4/2000 | Bennett et al. ................ 717/130 |
| 6,126,329 A | * | 10/2000 | Bennett et al. ................ 717/127 |
| 6,857,120 B1 | | 2/2005 | Arnold et al. |
| 7,386,838 B2 | | 6/2008 | Schmidt |
| 8,108,826 B2 | | 1/2012 | Li et al. |
| 2004/0199904 A1 | | 10/2004 | Schmidt |
| 2006/0218543 A1 | | 9/2006 | Boger |
| 2007/0006170 A1 | * | 1/2007 | Hasse et al. ................... 717/131 |
| 2009/0271769 A1 | * | 10/2009 | Krauss .......................... 717/133 |
| 2011/0145800 A1 | * | 6/2011 | Rao et al. ...................... 717/133 |

OTHER PUBLICATIONS

Zhang "Identifying use cases in source code", 2006, Journal of Systems and Software, vol. 79, Issue 11, pp. 1588-1598.*

* cited by examiner

*Primary Examiner* — Jason Mitchell

(57) ABSTRACT

Call graph construction systems that utilize computer hardware are presented including: a processor; a candidate pool configured for representing a number of calls originating from a root node of a computer software application; an importance value assigner configured for assigning an importance value for any of the number of calls represented in the candidate pool; a candidate selector configured for selecting from the number of calls represented in the candidate pool for inclusion in a call graph based on a sufficient importance value; and an importance value adjuster configured for adjusting the importance value of any call represented in the call graph.

15 Claims, 6 Drawing Sheets

IMPORTANCE-BASED CALL GRAPH CONSTRUCTION

CROSS-REFERENCE TO RELATED APPLICATIONS

The present invention is related to the following applications, all of which are incorporated herein by reference:

This application is a continuation of commonly assigned co-pending U.S. patent application Ser. No. 12/437,894 entitled, "IMPORTANCE-BASED CALL GRAPH CONSTRUCTION."

FIELD OF THE INVENTION

The invention relates to computer software analysis and testing in general, and more particularly to constructing call graphs for computer software applications in support of computer software analysis and testing.

BACKGROUND

Call graphs are powerful tools in describing and analyzing large and complex software applications, and are very useful for testing and debugging such applications. A dynamic call graph, describing to specific, execution of a software application out of many possibilities, is relatively easy to construct, but provides only a narrow view of the application it represents, and thus, the scope of analysis that one can perform using dynamic call graphs is limited. To remedy this, a static call graph may be constructed of a software application by analyzing the application source code and representing all possible executions of the application. However, the computational requirements of existing methods for constructing static call graphs, as well as the storage requirements for static call graphs themselves, may entail resource requirements that exceed available resources. Methods for constructing static call graphs that have reduced resource requirements would therefore be advantageous.

SUMMARY

The invention in embodiments thereof discloses novel systems and methods for constructing call graphs that have reduced resource requirements.

Call graph construction systems that utilize computer hardware are presented including: a processor, a candidate pool configured for representing a number of calls originating from a root node of a computer software application; an importance value assigner configured for assigning an importance value for any of the number of calls represented in the candidate pool; a candidate selector configured for selecting from the number of calls represented in the candidate pool for inclusion in a call graph based on a sufficient importance value; and an importance value adjuster configured for adjusting the importance value of any call represented in the call graph.

In some embodiments, systems further include: a static analyzer configured for analyzing instructions of the computer software application to identify the number of calls for inclusion in the candidate pool. In some embodiments, the static analyzer is further configured for identifying callees of the number of calls for inclusion in the candidate pool.

In some embodiments, the candidate selector is further configured for removing any call selected for inclusion in the call graph from the candidate pool. In some embodiments, the importance value assigner is configured to assign the importance value in accordance with a number of predefined importance rules. In some embodiments, the importance value adjuster is configured to adjust the importance value in accordance with a number of predefined importance adjustment rules.

In other embodiments, call graph systems that utilize computer hardware are presented including: a processor; a candidate pool configured for representing a number of calls originating from a root node of a computer software application; an importance value assigner configured for assigning an importance value in accordance with predefined importance rules for any of the number of calls represented in the candidate pool; a candidate selector configured for selecting from the number of calls represented in the candidate pool for inclusion in a call graph based on a sufficient importance value; an importance value adjuster configured for adjusting the importance value in accordance with predefined importance adjustment rules of any call represented in the call graph; and a static analyzer configured for analyzing, instructions of the computer software application to identify the number of calls for inclusion in the candidate pool and for identifying callees of the number of calls for inclusion in the candidate pool.

In some embodiments, the candidate selector further includes: a number of inclusion rules for the selecting; and a number of termination conditions for terminating the selecting. In some embodiments, the candidate selector is further configured for removing any call selected for inclusion in the call graph from the candidate pool.

BRIEF DESCRIPTION OF THE DRAWINGS

The invention will be understood and appreciated more fully from the following detailed description taken in conjunction with the appended drawings in which.

DETAILED DESCRIPTION

Figure 1:
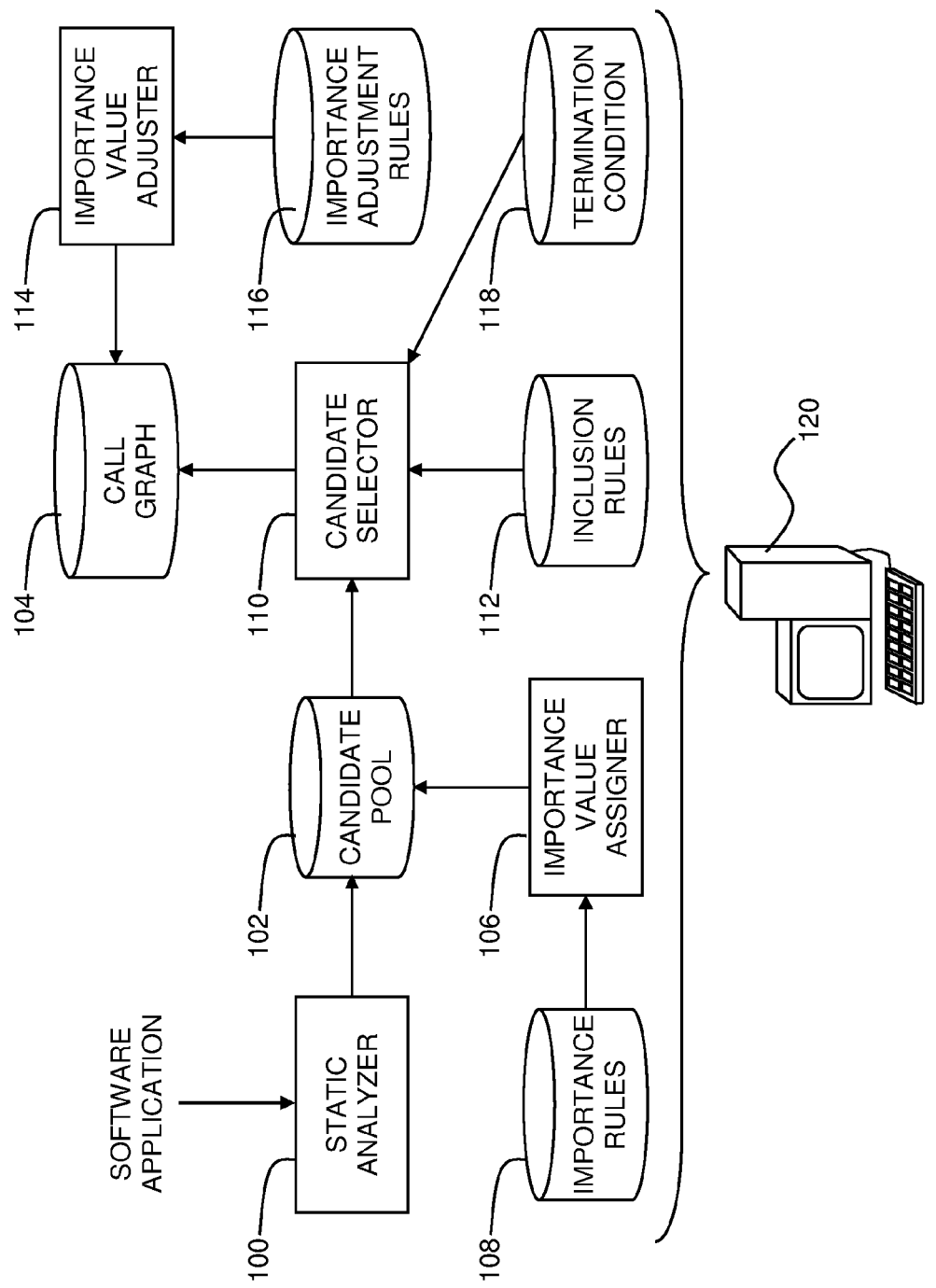
FIG. 1 is a simplified conceptual illustration of an importance-based call graph construction system, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of all entirely hardware embodiment, an entirely software embodiment (including, firmware, resident software, micro-code, etc) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be for example but not limited to, an electronic, magnetic, optical, electromagnetic, infrared, or semiconductor system, apparatus, device, or propagation medium. More specific examples (a non-exhaustive list) of the computer-readable medium would include the following; an electrical connection having one or more wires, a portable computer diskette, a hard disk, a random access memory (RAM) a read-only memory (ROM), an erasable programmable read-only memory (EPROM or Flash memory), an optical fiber, a portable compact disc read-only memory (CDR OM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable. RF, etc.

Computer program code for carrying out operations of the invention may be written in any combination of one or more programming languages, including an object oriented programming language such as Java. Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including, a local area network (LAN) or a wide area network (WAN), or the connection may be made to an external computer (for example, through the Internet using an Internet Service Provider).

The invention is described below with reference to flowchal 1 illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of an importance-based call graph construction system, constructed and operative in accordance with an embodiment of the invention. In the system of FIG. 1, a static analyzer 100 uses conventional methods to statically analyze the instructions of a computer software application, such as where the instructions are in the form of source code or bytecode, to identify calls, such as to methods or procedures. Each identified call is represented in a candidate pool 102 of calls that are considered for representation as nodes in a call graph 104. An importance value assigner 106 preferably assigns a predefined importance value to any of the candidates in pool 102 in accordance with predefined importance rules 108. A candidate selector 110 preferably selects any candidates in pool 102 for removal from pool 102 and representation as a node in call graph 104 in accordance with predefined inclusion rules 112. Each time a node is added to call graph 104 an importance value adjuster 114 preferably adjusts the importance value of any calls represented as nodes in call graph 104 in accordance with importance adjustment rules 116. Candidates are removed from pool 102 and included in call graph 104 in this manner until a predefined termination condition 118 is met, such as where a predefined maximum number of calls have been represented as nodes in call graph 104.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer 120.

Figure 2:
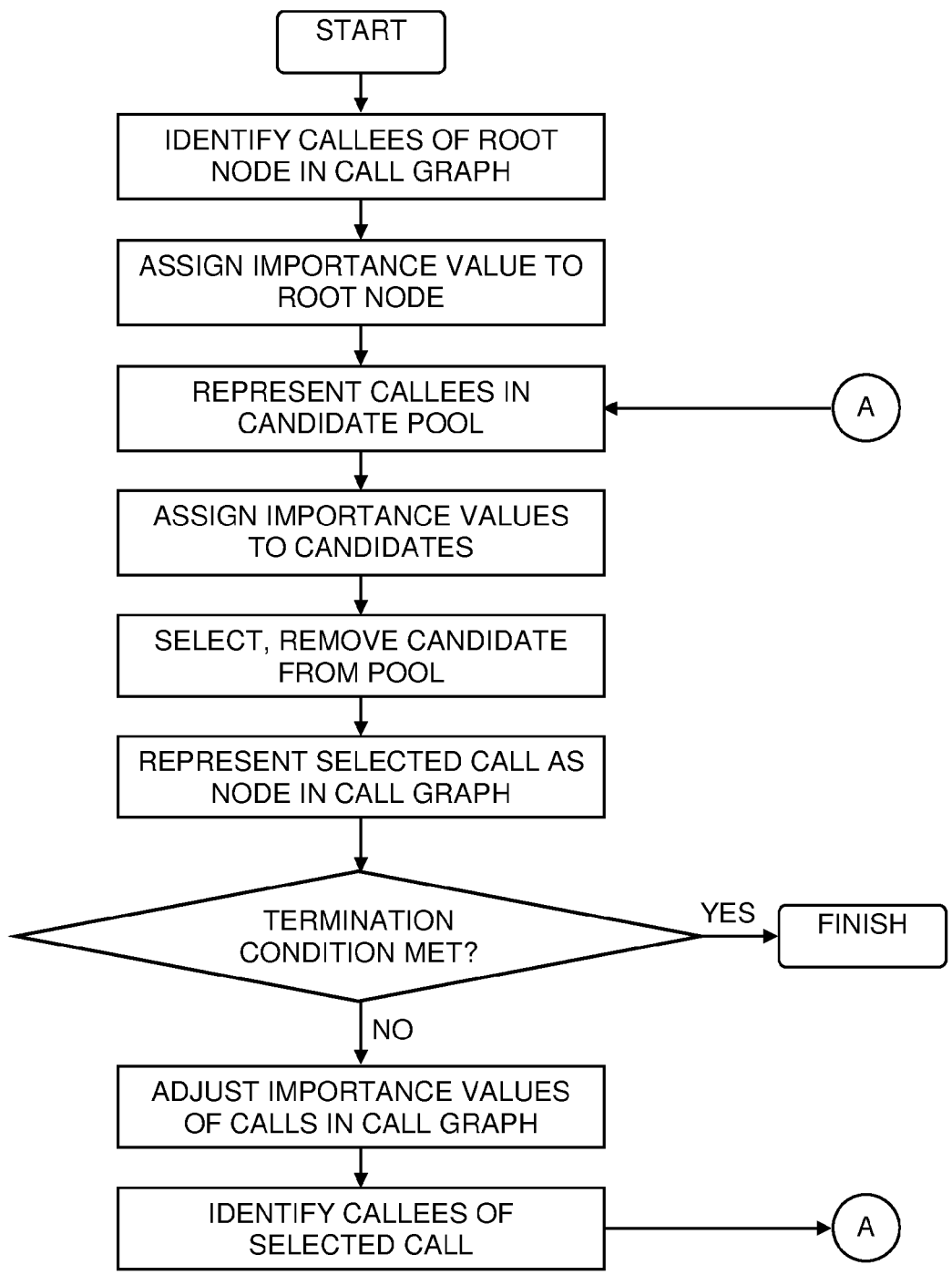
FIG. 2 is a simplified flowchart illustration of an exemplary method of operation of the system of FIG. 1 operative in accordance with an embodiment of the invention

Reference is now made to FIG. 2 which is a simplified flowchart illustration of an exemplary method of operation of the system of FIG. 1 operative in accordance with an embodiment of the invention. In the method of FIG. 2 a root node is used to form the basis of a call graph for a computer software application in accordance with conventional static analysis call graph construction techniques. The root node is analyzed using conventional static analysis techniques to identify any calls, such as to methods or procedures that originate from the root node. These "callees" are each represented in a candidate pool. The root node and the candidates that are represented in the candidate pool are all assigned predefined importance values in accordance with predefined importance rules as may be applicable. For example, importance rules may be defined such that the highest importance value is to be assigned to calls to methods that are found in one particular JAVA™ library that is of greatest interest to a software tester, whereas a lower importance value is to be assigned to calls to methods that are found in another JAVA™ library that is of less interest. Any value system may be used to represent importance values, such as an integer-based system where the value "0" represents the highest importance, the value "1" representing one degree of less importance, and so on.

A candidate in the pool is selected, removed from the pool, and represented as a node in the call graph in accordance with predefined inclusion rules, such as may dictate that the candidate with the greatest importance value be removed from the pool and represented in the call graph. Each time a node is added to the call graph the importance value of any call represented in the call graph may be adjusted in accordance with predefined importance adjustment rules. For example, importance adjustment rules may be defined to require that the importance value of any call represented in the call graph be increased such that no call in the call graph is more important than any of its neighboring calls by more than one degree of importance. This may be useful, for example, where the methods corresponding to neighboring calls are assumed to be close to each other in importance.

Callees of calls that are represented in the call graph are identified, added to the candidate pool, and assigned predefined importance values as described above. Preferably, this is done for a call after it is represented in the call graph and before the next candidate is selected. The process above of identifying callees, representing callees in the candidate pool, assigning importance values to candidates, selecting and removing candidates from the pool, representing selected candidates as nodes in the call graph, and adjusting importance values of calls represented in the call graph is preferably repeated until a predefined termination condition is met, such as where a predefined maximum number of calls are represented in the call graph.

Figure 3A:
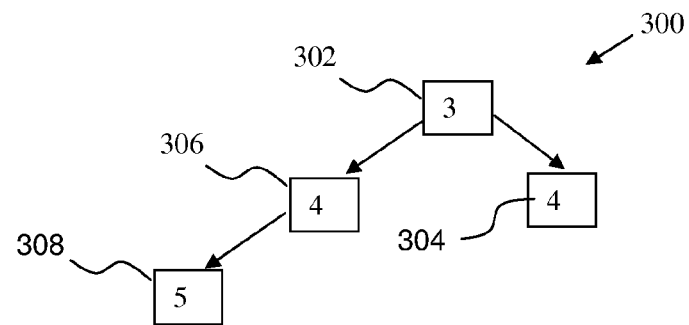
FIGS. 3A-3H are simplified graphical illustrations of exemplary results of an implementation of the method of FIG. 2.
Figure 3B:
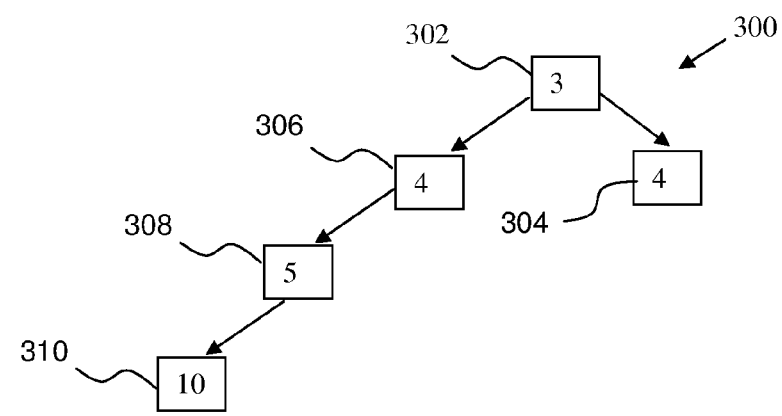
Figure 3C:
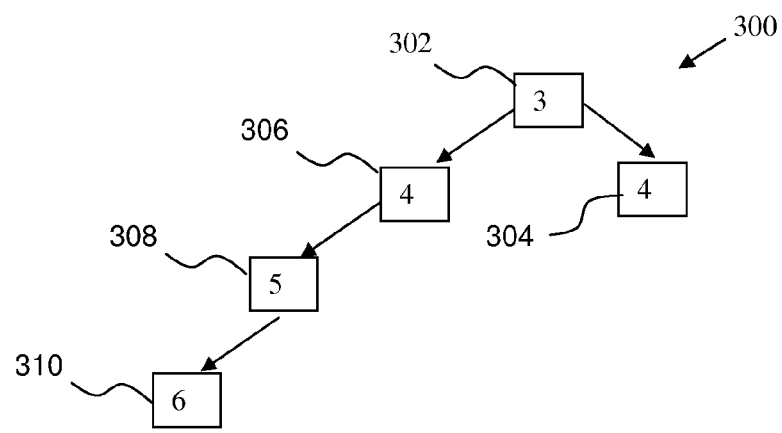
Figure 3D:
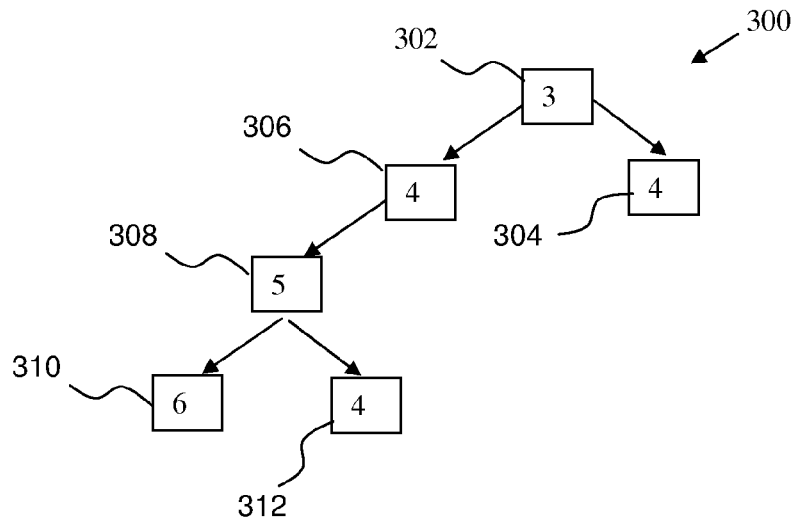

Reference is now made to FIGS. 3A - 3H, which as simplified graphical illustrations of exemplary results of an implementation of the method of FIG. 2. In FIG. 3A a call graph 300 of four nodes 302, 304, 306, and 308, is shown with node importance values displayed as positive integers. (A reference herein to the importance value of a node is to be understood as a reference to the importance value of the call that the node represents.) In FIG. 3B a node 310 having an importance value of 10 is shown having been added to graph 300, node 310 being a callee of node 308 that was removed from the node candidate pool for inclusion in call graph 300. In FIG. 3C the importance value of node 310 is shown as having been adjusted to have an importance value that is one degree less than the importance value of its immediate neighbor, node 308. As all other pairs of neighboring nodes in FIG. 3C have equal importance values or differ in importance by no more than one degree, no further adjustment is required of the importance values of the nodes in graph 300. In FIG. 3D a node 312 having an importance value of 4 is added to graph 300, requiring no adjustment of the importance values of the nodes in graph 300.

Figure 3E:
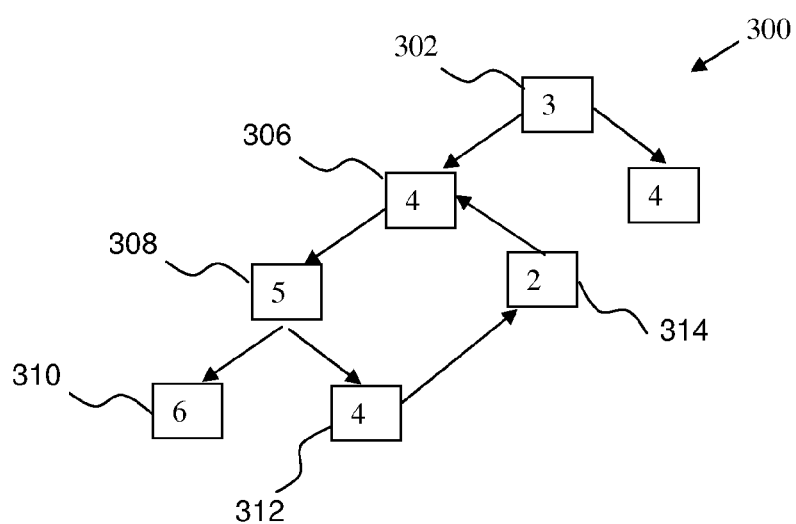
Figure 3F:
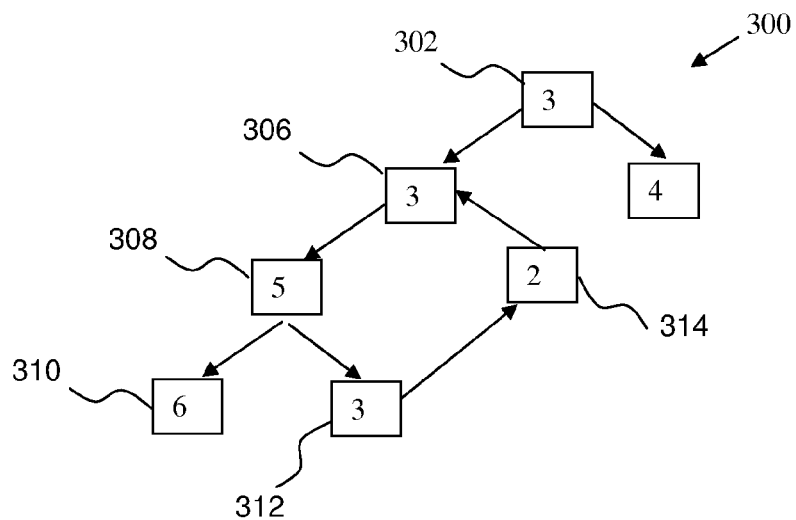
Figure 3G:
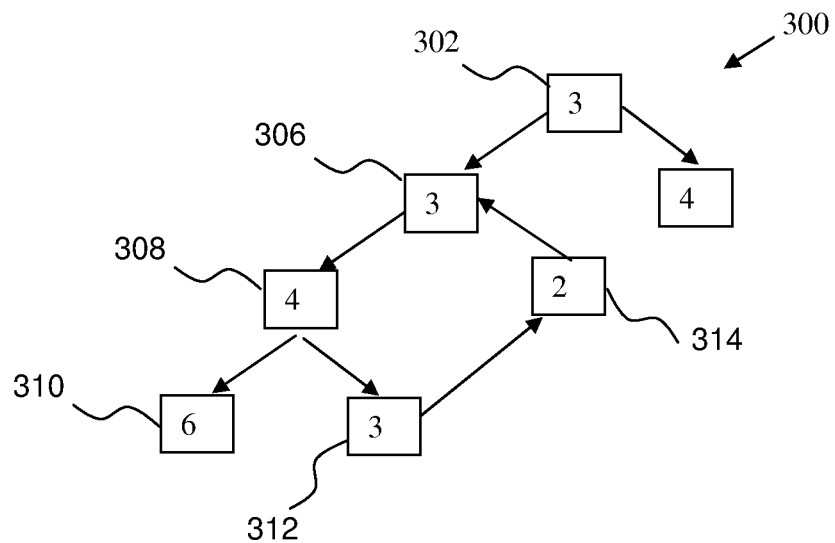
Figure 3H:
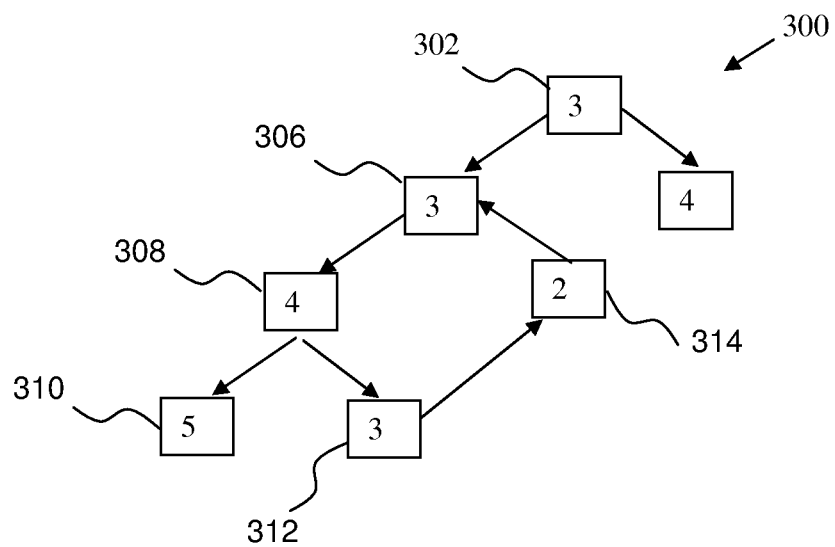

In FIG. 3E a node 314 having an importance value of 2 is added to graph 300, where node 314 is a neighbor of both node 306 and node 312. Being more than one degree of importance lower than node 314, the importance values of nodes 306 and 312 are adjusted to be within one degree of importance of node 314, as is shown in FIG. 3F, requiring in turn a similar adjustment of node 308, as shown in FIG. 3G, and of node 310, as shown in FIG. 3H.

It will be appreciated that invention is useful where computing resource constraints impose a limit to the number of nodes that may be included in the graph, and that constructing a call graph using importance-based criteria allows nodes that are considered to be more important to be included in the graph before nodes that are considered to be less important, thus resulting in an efficient use of computing resources in constructing the graph.

Figure 4:
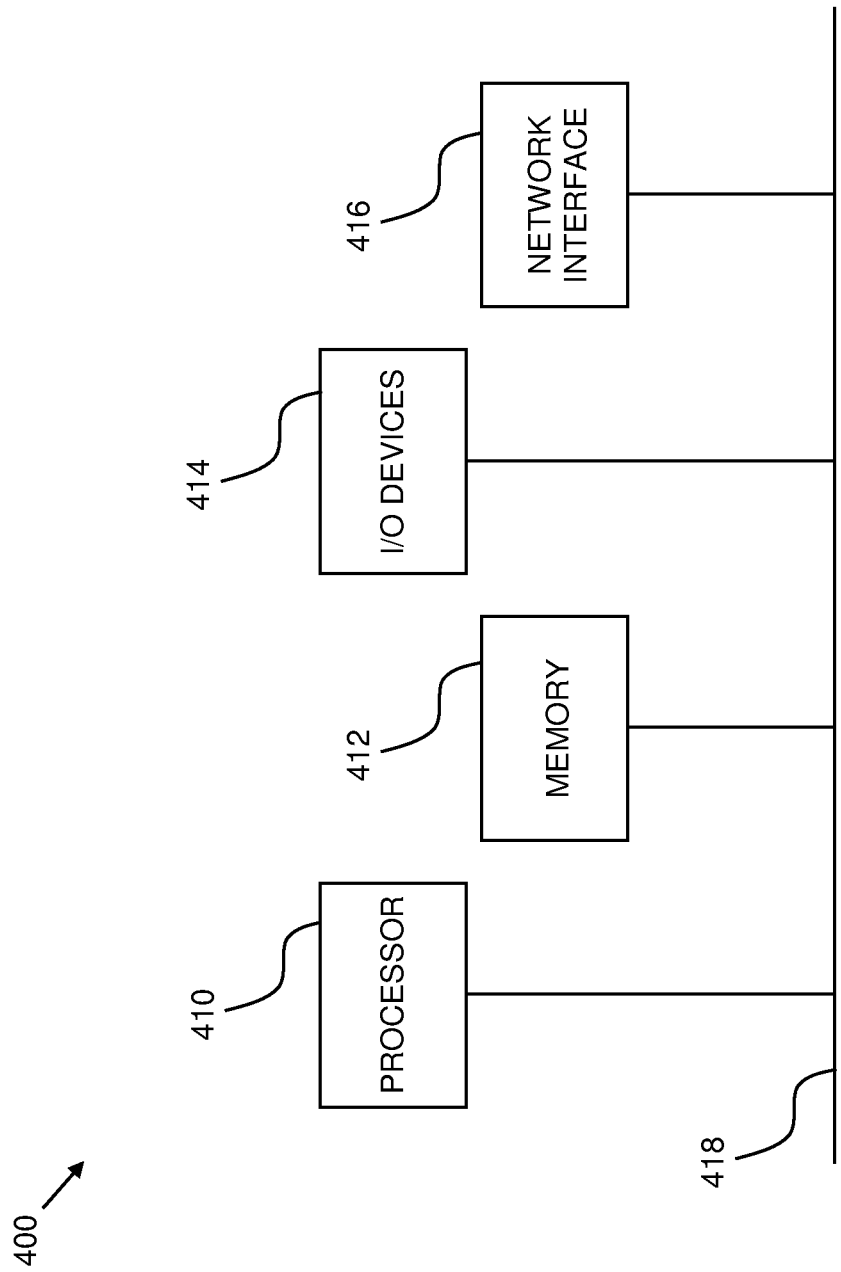
FIG. 4 is a simplified block diagram illustration of an exemplary hardware implementation of a computing system, constructed and operative in accordance with an embodiment of the invention.

Referring now to FIG. 4, a block diagram 400 illustrates an exemplary hardware implementation of a computing system in accordance with which one or more components/methodologies of the invention (e.g., components/methodologies described in the context of FIGS. 1 and 2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s), It should also be noted that, in sonic alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A call graph construction system that utilizes computer hardware comprising:
   a processor;
   a candidate pool configured for representing a plurality of calls originating from a root node of a computer software application;
   an importance value assigner configured for assigning an importance value for the root node and for any of the plurality of calls represented in the candidate pool in accordance with predefined importance rules of greatest interest to a user, wherein the importance value defines a relative importance of each of the plurality of calls and the root node;
   a candidate selector configured for selecting calls from the plurality of calls represented in the candidate pool, wherein the calls are selected for inclusion in a call graph as nodes when the call has a sufficient importance value; and
   an importance value adjuster configured for adjusting the importance value of any neighboring call represented in the call graph according to the importance value assigned to the calls selected for inclusion from the candidate pool.

2. The system of claim 1, further comprising:
   a static analyzer configured for analyzing instructions of the computer software application to identify the plurality of calls for inclusion in the candidate pool.

3. The system of claim 2, wherein the static analyzer is further configured for identifying callees of the plurality of calls for inclusion in the candidate pool.

4. The system of claim 2, wherein the instructions are selected from the group consisting of: source code and bytecode.

5. The system of claim 1, wherein the candidate selector further comprises a plurality of inclusion rules for the selecting.

6. The system of claim 1, wherein the candidate selector further comprises a plurality of termination conditions for terminating the selecting.

7. The system of claim 1, wherein the candidate selector is further configured for removing any call selected for inclusion in the call graph from the candidate pool.

8. The system of claim 1, wherein the importance value assigner is configured to assign the importance value in accordance with a plurality of predefined importance rules.

9. The system of claim 1, wherein the importance value adjuster is configured to adjust the importance value in accordance with a plurality of predefined importance adjustment rules.

10. The system of claim 1, wherein the plurality of calls are selected from the group consisting of: a method call and a procedure call.

11. The system of claim 1, wherein calls in the call graph are represented as nodes.

12. The system of claim 1, wherein the importance value assigner is further configured for assigning the importance value for the root node.

13. A call graph construction system that utilizes computer hardware comprising:
    a processor;
    a candidate pool configured for representing a plurality of calls originating from a root node of a computer software application;
    an importance value assigner configured for assigning an importance value in accordance with a plurality of predefined importance rules for the root node and for any of the plurality of calls represented in the candidate pool in accordance with predefined importance rules of greatest interest to a user, wherein the importance value defines a relative importance of the plurality of calls and the root node;
    a candidate selector configured for selecting calls from the plurality of calls represented in the candidate pool, wherein the calls are selected for inclusion in a call graph when the call has a sufficient importance value;
    an importance value adjuster configured for adjusting the importance value in accordance with a plurality of predefined importance adjustment rules of any call represented in the call graph according to the importance value assigned to the calls selected for inclusion from the candidate pool; and
    a static analyzer configured for analyzing instructions of the computer software application to identify the plurality of calls for inclusion in the candidate pool and for identifying callees of the plurality of calls for inclusion in the candidate pool.

14. The system of claim 13, wherein the candidate selector further comprises:
    a plurality of inclusion rules for the selecting; and
    a plurality of termination conditions for terminating the selecting.

15. The system of claim 13, wherein the candidate selector is further configured for removing any call selected for inclusion in the call graph from the candidate pool.

* * * * *